United States Patent
Xu

(10) Patent No.: US 7,295,432 B2
(45) Date of Patent: Nov. 13, 2007

(54) RAIL ASSEMBLY FOR A DATA STORAGE DEVICE

(75) Inventor: Ji-Guo Xu, Shenzhen (CN)

(73) Assignees: Hong Fu Jin Precision Industry (Shenzhen) Co., Ltd., Bao-an District, Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 236 days.

(21) Appl. No.: 11/021,384

(22) Filed: Dec. 23, 2004

(65) Prior Publication Data

US 2005/0276013 A1 Dec. 15, 2005

(30) Foreign Application Priority Data

Jun. 9, 2004 (CN) .................. 2004 2 0083979 U

(51) Int. Cl.
*H05K 7/00* (2006.01)

(52) U.S. Cl. ...................... 361/685; 361/726; 361/727

(58) Field of Classification Search ................ 361/685, 361/726, 727; 312/223.1–223.2
See application file for complete search history.

(56) References Cited

U.S. PATENT DOCUMENTS

| 5,332,306 | A  | * | 7/1994  | Babb et al. ............ 312/334.16 |
| 6,313,985 | B1 |   | 11/2001 | Chen et al. |
| 6,370,022 | B1 | * | 4/2002  | Hooper et al. .............. 361/685 |
| 6,464,085 | B1 | * | 10/2002 | Chin et al. .................... 211/26 |
| 6,590,775 | B2 | * | 7/2003  | Chen .......................... 361/725 |

* cited by examiner

*Primary Examiner*—Jayprakash Gandhi
*Assistant Examiner*—Ingrid Wright
(74) *Attorney, Agent, or Firm*—Morris Manning Martin LLP; Tim Tingkang Xia, Esq.

(57) ABSTRACT

A rail assembly for a data storage device includes a bracket (30) comprising a first wall (34), a rail (60) attached to the first wall (34) and a fastener (80) comprising a set of latches (84). The first wall (34) defining a set of through holes (344), the rail (60) defining a plurality of sets of locating holes (630) according to the through holes (344) of the first wall (34) and the latches (84) of the fastener (80). Wherein the latches of the fastener are extended through the through holes of the first wall and engage with one selected set of the locating holes of the rail respectively.

21 Claims, 5 Drawing Sheets

RAIL ASSEMBLY FOR A DATA STORAGE DEVICE

BACKGROUND OF THE INVENTION

1. Field of the Invention

The present invention relates to a rail assembly for a data storage device of a computer, and particularly to a rail assembly which facilitates adjusting fixed position of the data storage device.

2. Description of the Related Art

As the computer industry develops, varieties of computer enclosures are provided to satisfy needs of different users. So different ornamental computer front bezels are attached to a bracket to form different aesthetic computer enclosures. However, a data storage device will received in the computer bracket protrude out or recede from the enclosure due to the front bezels of different thickness, consequently this will influence the appearance of the computer.

In U.S. Pat. No. 6,313,985, an improved rail assembly for a data storage device is disclosed. A rail assembly is adapted for mounting a data storage device in a computer enclosure. The rail assembly comprises a rail and a conductive fastener attached to the rail for fixing the rail to a data storage device. The rail comprises a body and a latch so connected with the body as to be capable of a flexing movement relative to the body for engaging with a computer enclosure. The body defines a number of pairs of through holes and a first slot. The fastener comprises a pair of tabs for engagingly extending into a selected pair of the through holes of the rail and a pair of posts for extending through the first slot of the rail to securely engaging with the data storage device. The fastener can mount the rail to the data storage device with the rail attached at a number of different positions relative to the data storage device. By selectively engaging the tabs of the fastener with the holes of the rail, the relative position of the rail with respect to the fastener and thus the CD-ROM drive is adjustable. Thus, the position of the CD-ROM drive is adjustable relative to the panel. The procedure for fixing the rails to the drive brackets is complicated and troublesome when manufacturing it.

Therefore, what is needed is a rail assembly for conveniently adjusting fixed position of corresponding to front bezel of different thickness.

SUMMARY OF THE INVENTION

Accordingly, an object of the present invention is to provide a rail assembly for a data storage device for conveniently adjusting fixed position of corresponding to front bezel of different thickness.

To achieve the above-mentioned object, a rail assembly for a data storage device comprises a bracket comprising a first wall, a fastener comprising a set of latches and a rail for being detachably attached to the data storage device. The first wall is defined a set of through holes. The rail is detachably attached to the data storage device, and the rail defining at least two sets of locating holes corresponding to the through holes of the first wall and the latches of the fastener. Wherein the latches of the fastener are extended through the through holes of the first wall and engaged with one selected set of the locating holes of the rail.

DETAILED DESCRIPTION OF THE INVENTION

Figure 1:
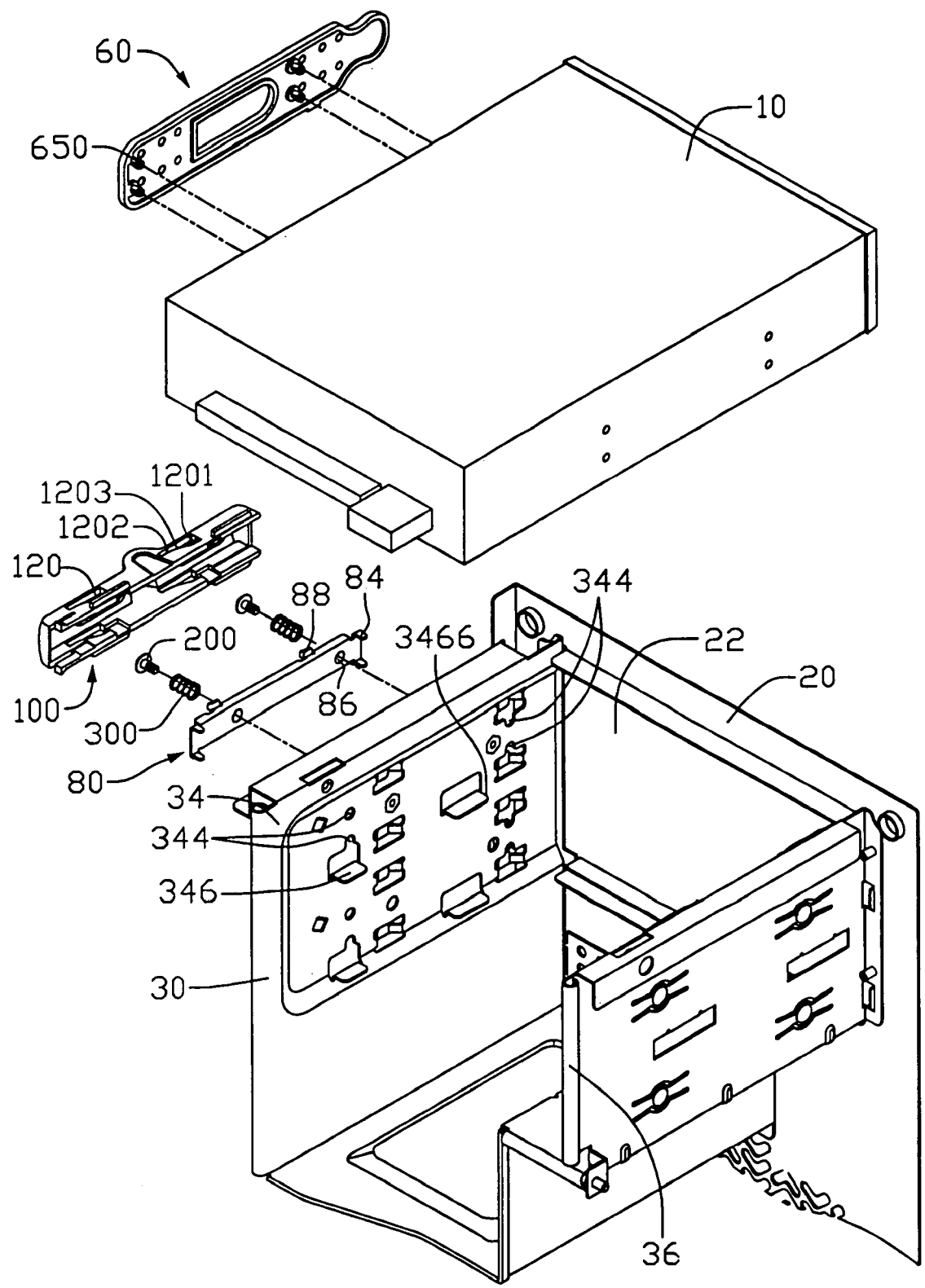
FIG. 1 is an exploded, isometric view of a rail assembly for a data storage device in accordance with a preferred embodiment of the present invention.
Figure 2:
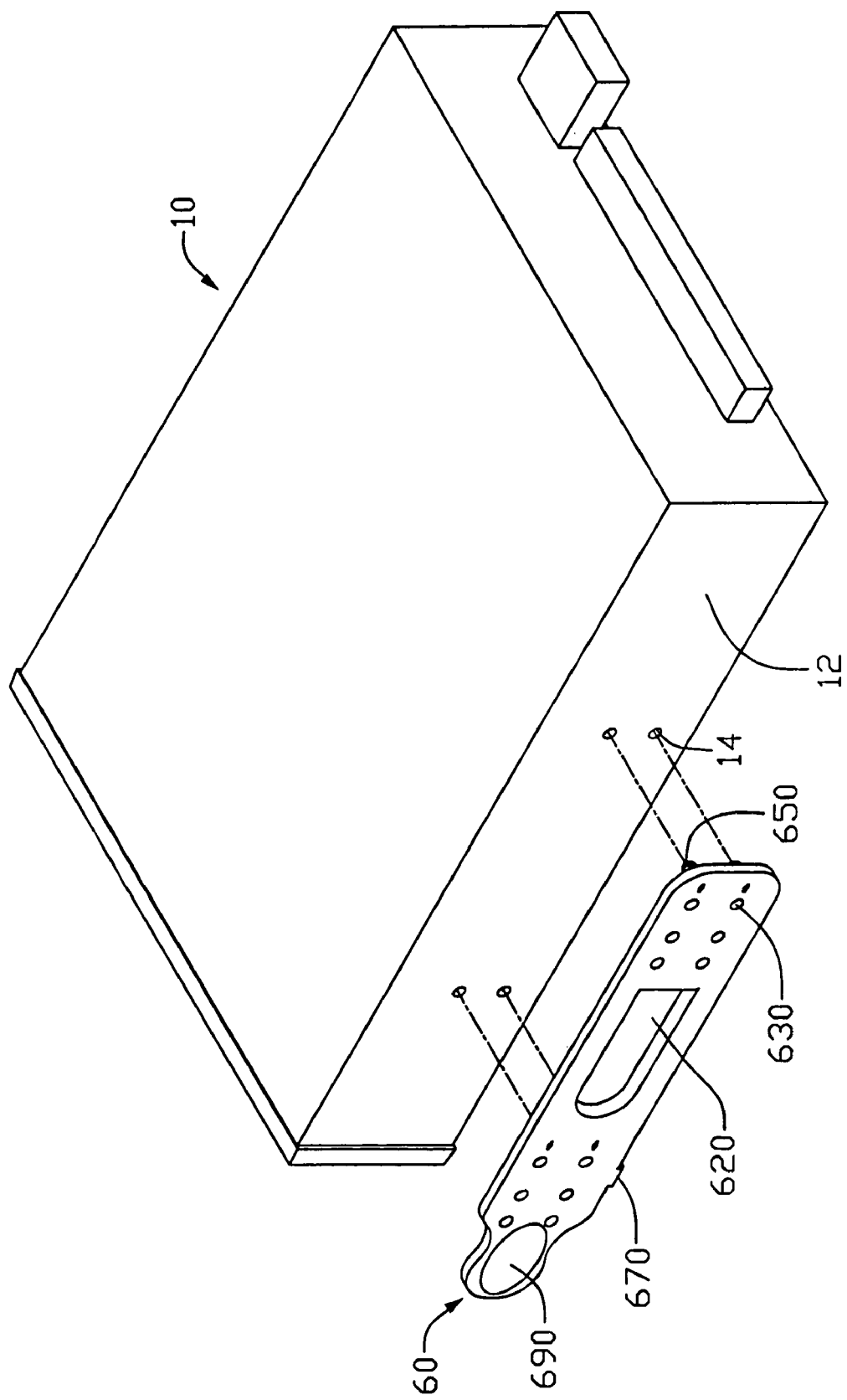
FIG. 2 is an isometric view of a rail and a data storage device of FIG. 1.

Referring to FIGS. 1 and 2, a rail assembly of a mounting mechanism for a data storage device of an electronic device like a computer in accordance with the preferred embodiment of the present invention comprises the data storage device 10, a panel 20 defining an opening 22, a bracket 30, a rail 60, a fastener 80, a slider 100, a pair of screw 200 and a pair of springs 300.

The data storage device 10 defines two pairs of apertures 14 in each side wall 12.

The bracket 30 is attached to the panel 20 around the opening 22. The bracket 30 comprises a first wall 34 and a second wall 36 to define commonly a space in the bracket 30. The first wall 34 defines three sets of through holes 344, and each set of through holes 344 comprise two pairs of holes defined in two ends of the first wall 34 respectively. A pair of supporting plates 346 is stamped inwardly from the first wall 34 below the through holes 344. The second wall 36 also forms a pair of supporting plates (not shown). Each supporting plate 346 of the first wall 34 comprises a stopping edge 3466.

The rail 60 is attached to the side wall 12 of the storage device 10. The rail 60 has a slot 620 defined in a middle position thereof, three sets of locating holes 630 defined in two end positions of the rail 60, two pairs of fixing posts 650 extended inwardly from an inner surface of the rail 60. A locating block 670 is extended downward from the lower edge of the rail 60. A handle 690 is formed at a front end of the rail 60. Each set of locating holes 630 includes a pair of vertically spaced front holes and a pair of vertically spaced rear holes, and distances between the front holes and the rear holes of each set of locating holes are equal. When the rail 60 is attached to the bracket 30, the locating block 670 will be stopped by the stopping edge 3466 of the supporting plate 346, and the rail 60 will be stopped in the bracket 30 correspondingly.

The fastener 80 comprises two pairs of latches 84 extended inwardly from opposite ends respectively, for being extended through one selected set of the through holes 344 of the bracket 30 and engaging with one selected set locating holes 630 of the rail 60 respectively. The fastener 80 defines a pair of holes 86, and two pairs of clips 88 are extended from top and bottom edges respectively.

The slider 100 comprises a top wall and a bottom wall. A pair of sliding slots 120 is defined in each of the top and bottom walls, for engaging with the clips 88 of the fastener 80. Each sliding slot 120 comprises a wide portion 1201, a narrow portion 1202 and a slanted sliding surface 1203.

Figure 3:
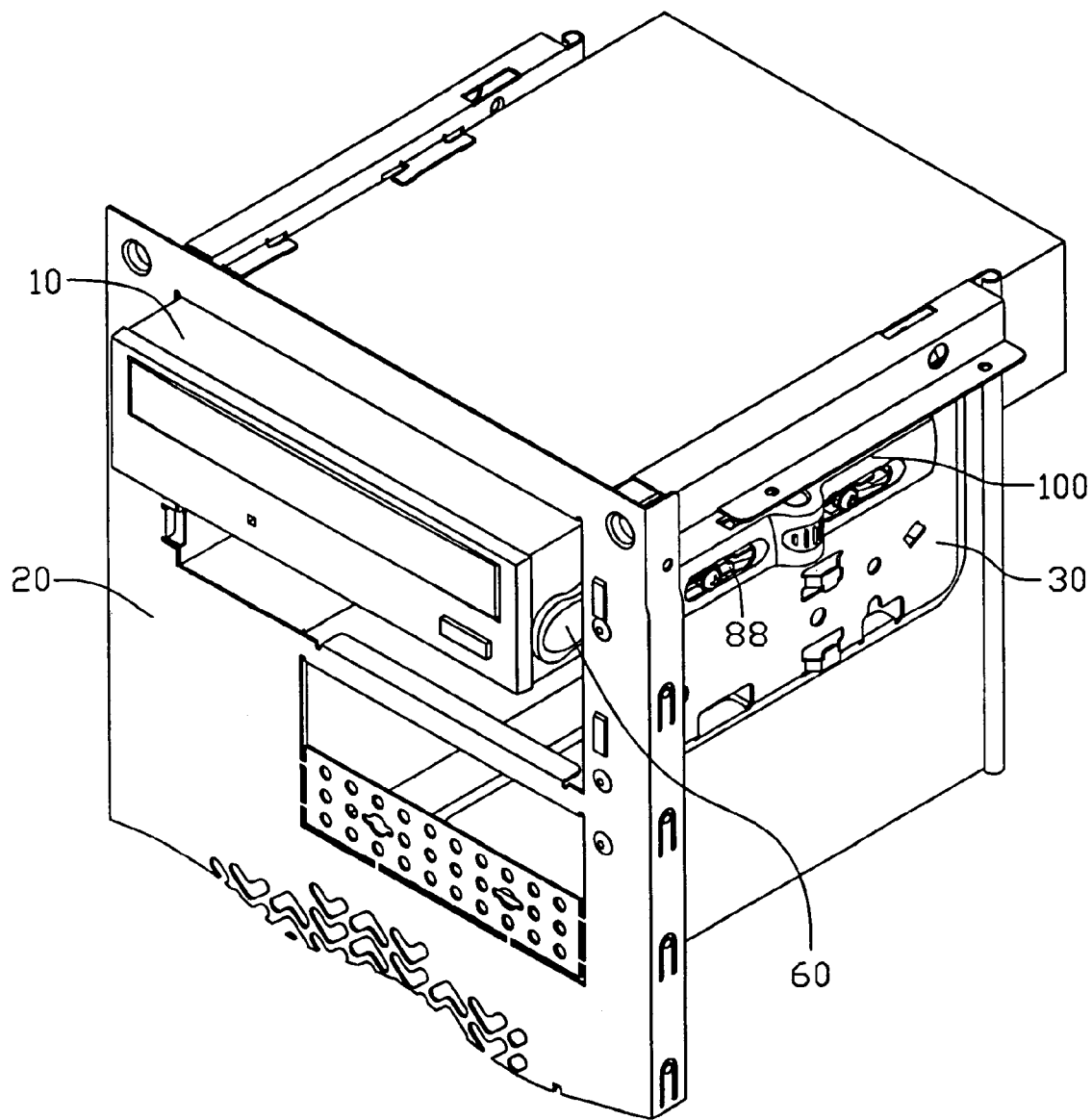
FIGS. 3 and 4 are assembled views of FIG. 1, showing the data storage device fixed at different positions relative to a panel of the rail assembly but viewed from another aspect.
Figure 4:
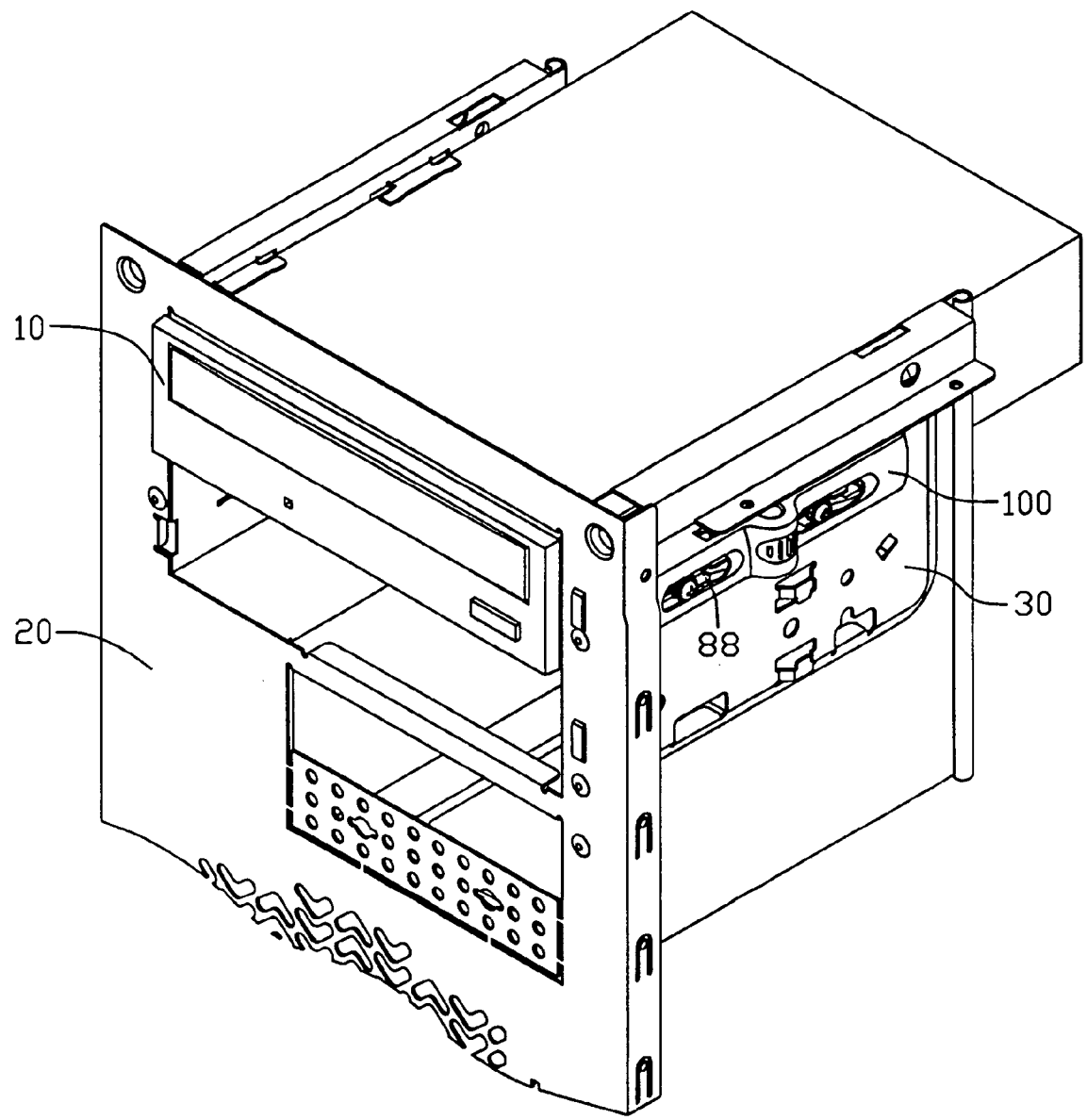

Referring to FIGS. 3 and 4, in assembly, the fixing posts 650 of the rail 60 are inserted into the apertures 14 of the side wall 12 of the data storage device 10 respectively. The combined data storage device 10 and rail 60 are installed into a space above the supporting plates 346 in the bracket 30 through the opening 22 of the panel 20. When the locating block 670 of the rail 60 is stopped by the stopping edge 3466, one set locating holes 630 of the rail 60 is aligned with one set through holes 344 of the bracket 30.

Then screws 200 are extended through the springs 300 and the holes 86 of the fastener 80, and are engaged with screw holes of the first wall 34 of the bracket 30 respectively. The latches 84 of the fastener 80 are extended through the through holes 344 of the first wall 34 and engaged with the locating holes 630 of the rail 60 correspondingly. Then the rail 60 is located in the bracket 30 and the data storage device 10 is located in the bracket 30. The slider 100 is slidably attached to the first wall 34 of the bracket 30 and the clips 88 of the fastener 80 are in the wide portions 1201 of the slots 120.

In use, the slider 100 is pushed, and the clips 88 of the fastener 80 are moved from the wide portions 1201 to the narrow portions 1202 along the sliding surfaces 1203 respectively. Thus the fastener 80 is pushed away from the first wall 34 by the sliding surfaces 1203, and the springs 300 are thereby compressed. And then the latches 84 of the fastener 80 are withdrawn from the locating holes 630 of the rail 60 and the through holes 344 of the bracket 30 respectively. The data storage device 10 can be detached from the bracket 30 easily.

If desired, the latches 84 of the fastener 80 can be engaged with other sets of locating holes 630 of the rail 60 respectively. Thus the combined rail 60 and data storage device 10 will have three positions relating to the bracket 30 and the panel 20.

Figure 5:
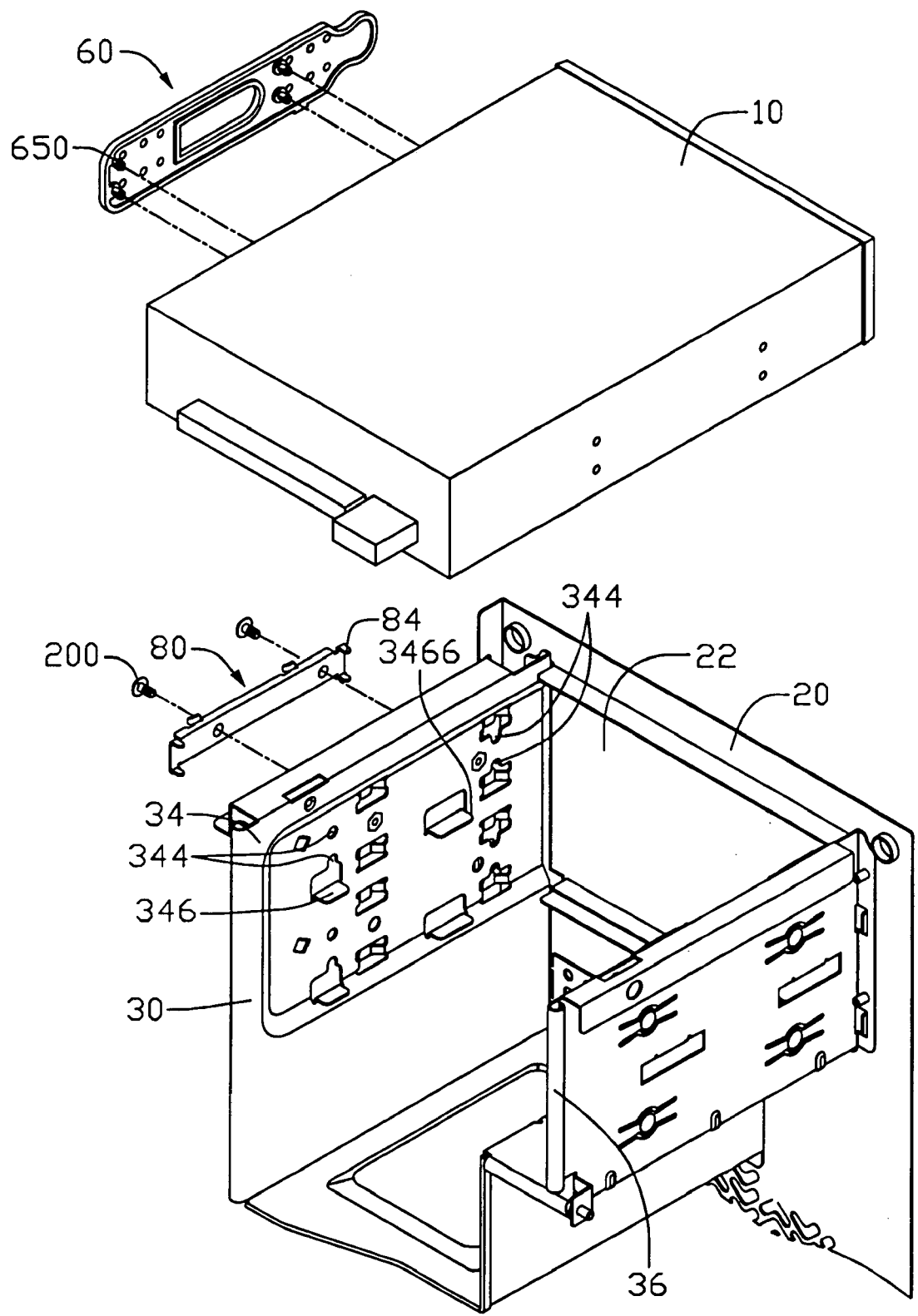
FIG. 5 is an alternative embodiment of the rail assembly of the present invention.

FIG. 5 illustrates another embodiment of the present invention, where the fastener 80 is attached to the first wall 34 of the bracket 30 by a plurality of screws 200 directly.

In another embodiment of the present invention, where a plurality of screws 200 or other fastening members are directly extended through the through holes 344 of the bracket 30 and engaged with the locating holes 630 of the rail 60 respectively.

While the present invention has been illustrated by the description of the preferred embodiments thereof, and while the preferred embodiments have been described in considerable detail, it is not intended to restrict or in any way limit the scope of the appended claims to such detail. Additional advantages and modifications within the spirit and scope of the present invention will readily appear to those skilled in the art. Therefore, the present invention is not limited to the specific details and illustrative examples shown and described.

I claim:

1. A rail assembly for a data storage device, comprising:
   a bracket comprising a first wall, the first wall defining a set of through holes;
   a fastener movably attached to an outside of the first wall of the bracket and comprising a set of latches corresponding to the through holes of the first wall; and
   a rail detachably attached to the data storage device, the rail defining at least two sets of locating holes therealong;
   wherein the latches of the fastener are extended through the through holes of the first wall and selectively engaged with one set of the locating holes of the rail.

2. The rail assembly for a data storage device as claimed in claim 1, wherein the bracket comprises a second wall, a plurality of supporting plates is stamped inwardly from the first wall and the second wall respectively for supporting the data storage device.

3. The rail assembly for a data storage device as claimed in claim 1, wherein each set of locating holes of the rail comprises two pairs of holes.

4. The rail assembly for a data storage device as claimed in claim 3, wherein said set of through holes of the first wall comprises two pairs of holes.

5. The rail assembly for a data storage device as claimed in claim 4, wherein said set of latches of the fastener comprises two pairs of latches extending from two ends of the fastener respectively.

6. The rail assembly for a data storage device as claimed in claim 1, wherein the rail comprises at least a pair of fixing posts for engaging with a pair of apertures of the data storage device.

7. The rail assembly for a data storage device as claimed in claim 1, wherein a locating block extends downward from a bottom edge of the rail.

8. The rail assembly for a data storage device as claimed in claim 1, further comprising a slider attached to the first wall, wherein the slider defines two pairs of sliding slots in a top surface and a bottom surface of the slider respectively, each of the sliding slots comprises a wide portion, a narrow portion, and a slanted sliding surface.

9. The rail assembly for a data storage device as claimed in claim 8, wherein two pairs of clips extend from a top edge and a bottom edge of the fastener respectively to slidably engage in the sliding slots of the fastener.

10. The rail assembly for a data storage device as claimed in claim 1, further comprising a pair of springs and a pair of screws corresponding to the pair of springs, the screws are fixed with the corresponding springs to attach the fastener to the first wall of the bracket.

11. A rail assembly for a data storage device, comprising:
    a bracket comprising a first wall defining a set of through holes;
    a plurality of fastening members, each of which is movably attached to an outside of the first wall of the bracket; and
    a rail detachably attached to the first wall, the rail defining a plurality of sets of locating holes;
    wherein the fastening members are extended through the through holes of the first wall and selectively engaged with one set of the locating holes of the rail.

12. The rail assembly for a data storage device as claimed in claim 11, wherein the bracket comprises a second wall, a plurality of supporting plates is stamped inwardly from each of the first wall and the second wall respectively for supporting the data storage device.

13. The rail assembly for a data storage device as claimed in claim 11, wherein each set of locating holes of the rail comprises two pairs of holes.

14. The rail assembly for a data storage device as claimed in claim 13, wherein said set of through holes of the first wall comprises two pairs of holes.

15. The rail assembly for a data storage device as claimed in claim 11, wherein a locating block extends downward from a bottom edge of the rail.

16. The rail assembly for a data storage device as claimed in claim 11, wherein the fastening members are screws.

17. The rail assembly for a data storage device as claimed in claim 16, further comprising a slider attached to the first wall, wherein the slider defines two pairs of sliding slots in a top surface and a bottom surface of the slider respectively, each of the sliding slots comprises a wide portion, a narrow portion and a slanted sliding surface.

18. The rail assembly for a data storage device as claimed in claim 17, further comprising a fastener movably attached to the first wall, wherein two pairs of clips extend from a top edge and a bottom edge of the fastener respectively to slidably engage in the sliding slots of the fastener.

19. The rail assembly for a data storage device as claimed in claim 18, further comprising a pair of springs arranged between the screws and the fastener respectively.

20. A mounting mechanism for installing a data storage device in an electronic device, comprising:
- a bracket installed in said electronic device and defining a space therein to receive said data storage device, a wall of said bracket disposed beside said space and having a through hole thereon;
- a fastening member movably attached to said wall of said bracket outside said space and having a latch, corresponding to said through hole, extendable through said through hole into said space; and
- a rail separably attached to said data storage device and movable together therewith, said rail having at least two locating holes formed thereon facing said wall of said bracket, a first one of said at least two locating holes aligning with said through hole in case that said data storage device moves to a first location thereof in said space and a second one of said at least two locating holes aligning with said through hole in case that said data storage device moves to a second location thereof in said space different from said first location thereof, thereby said latch selectively engagable with said first and second ones of said at least two locating holes to fixedly mount said data storage device in one of said first and second positions thereof in said space of said bracket.

21. The mounting mechanism as claimed in claim 20, wherein said fastening member is attached to said bracket by means of resting on a slider so as to have engagement of said latch and said first and second ones of said at least two locating holes being controllable by movement of said slider.

* * * * *